(12) United States Patent
Zhang et al.

(10) Patent No.: US 11,276,419 B2
(45) Date of Patent: Mar. 15, 2022

(54) SYNCHRONIZED SOUND GENERATION FROM VIDEOS

(71) Applicant: INTERNATIONAL BUSINESS MACHINES CORPORATION, Armonk, NY (US)

(72) Inventors: Yang Zhang, Cambridge, MA (US); Chuang Gan, Cambridge, MA (US); Sijia Liu, Somerville, MA (US); Dakuo Wang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 359 days.

(21) Appl. No.: 16/526,990

(22) Filed: Jul. 30, 2019

(65) Prior Publication Data

US 2021/0035599 A1  Feb. 4, 2021

(51) Int. Cl.
*G10L 25/57* (2013.01)
*G10L 25/30* (2013.01)
(Continued)

(52) U.S. Cl.
CPC ............ *G10L 25/57* (2013.01); *G06N 3/0454* (2013.01); *G10L 25/30* (2013.01); *H04N 21/8106* (2013.01); *H04N 21/8456* (2013.01)

(58) Field of Classification Search
CPC ............... G06F 3/04845; G06F 40/45; G06N 3/0454; G06T 11/20; G07C 5/08; G10L 25/24; G10L 25/30; G10L 25/57; G10L 15/1822; G10L 15/24; G10L 15/26; G10L 21/06; H04N 21/8106; H04N 21/8456; H04N 21/854; H04N 21/2343; H04N 21/4886;
(Continued)

(56) References Cited

U.S. PATENT DOCUMENTS 5,657,426 A * 8/1997 Waters .................... G10L 15/24
                                                    704/270
6,249,292 B1 * 6/2001 Christian .............. G06T 13/205
                                                    345/473
(Continued)

FOREIGN PATENT DOCUMENTS

CN     102724498 B    12/2015
CN     108566558 A    9/2018
(Continued)

OTHER PUBLICATIONS

International Search Report and Written Opinion from related application No. PCT/IB2020/056602, 9 pgs.
(Continued)

*Primary Examiner* — Gerald Gauthier
(74) *Attorney, Agent, or Firm* — Intelletek Law Group, PLLC; Gabriel Daniel, Esq.

(57) ABSTRACT

A computing device receives a video feed. The video feed is divided into a sequence of video segments. For each video segment, visual features of the video segment are extracted. A predicted spectrogram is generated based on the extracted visual features. A synthetic audio waveform is generated from the predicted spectrogram. All synthetic audio waveforms of the video feed are concatenated to generate a synthetic soundtrack that is synchronized with the video feed.

18 Claims, 9 Drawing Sheets

(51) Int. Cl.
  *G06N 3/04* (2006.01)
  *H04N 21/81* (2011.01)
  *H04N 21/845* (2011.01)

(58) Field of Classification Search
  CPC ........... H04N 21/8133; G06K 9/00228; G06K 9/00302; G11B 27/034; G11B 27/10; G11B 27/105; G11B 27/3045; G16H 50/20
  USPC .......... 345/473; 386/248; 600/588; 704/704, 704/260, 270, 276; 709/217, 218, 224; 725/116; 382/224
  See application file for complete search history.

(56) References Cited

U.S. PATENT DOCUMENTS

| | | | | |
|---|---|---|---|---|
| 6,539,354 | B1* | 3/2003 | Sutton | G10L 21/06 345/423 |
| 6,631,403 | B1* | 10/2003 | Deutsch | H04N 21/23412 709/217 |
| 6,754,389 | B1* | 6/2004 | Dimitrova | G06K 9/00228 382/224 |
| 8,768,945 | B2 | 7/2014 | Sathya | |
| 8,825,489 | B2* | 9/2014 | Scoggins, II | G11B 27/105 704/270 |
| 9,332,319 | B2* | 5/2016 | Tsai | H04N 21/4884 |
| 9,338,420 | B2 | 5/2016 | Xiang | |
| 10,057,537 | B1* | 8/2018 | MacDonald-King | H04N 21/8456 |
| 2007/0250597 | A1* | 10/2007 | Resner | H04N 21/8113 709/218 |
| 2008/0183106 | A1* | 7/2008 | Covelli | G16H 15/00 600/588 |
| 2008/0263612 | A1* | 10/2008 | Cooper | H04N 5/04 725/116 |
| 2010/0254676 | A1* | 10/2010 | Ebato | H04N 21/854 386/248 |
| 2011/0060590 | A1* | 3/2011 | Katae | G11B 27/10 704/260 |
| 2014/0250219 | A1* | 9/2014 | Hwang | G06F 40/45 709/224 |
| 2017/0213391 | A1 | 7/2017 | Feng et al. | |
| 2017/0318257 | A1* | 11/2017 | Mullen | H04N 5/9305 |
| 2018/0158922 | A1 | 6/2018 | Marck et al. | |
| 2020/0076988 | A1* | 3/2020 | Aides | G06N 3/0454 |
| 2020/0126583 | A1* | 4/2020 | Pokharel | G10L 15/1822 |
| 2021/0035599 | A1* | 2/2021 | Zhang | H04N 21/251 |
| 2021/0099505 | A1* | 4/2021 | Ravine | H04L 12/1822 |
| 2021/0195142 | A1* | 6/2021 | Mireles | G06T 11/20 |

FOREIGN PATENT DOCUMENTS

| | | |
|---|---|---|
| CN | 109194899 A | 1/2019 |
| DE | 102017123068 A1 | 4/2019 |
| WO | 2017079735 A1 | 5/2017 |

OTHER PUBLICATIONS

Montagnuolo, M. et al., "Parallel Neural Networks for Multimodal Video Genre Classification"; Multimed Tools Appl (2009), vol. 41, pp. 125-159.

Zhou, Y. et al., "Visual to Sound: Generating Natural Sound for Videos in the Wild"; arXiv:1712.01393v2 [cs.CV] (2018); 9 pgs.

* cited by examiner

SYNCHRONIZED SOUND GENERATION FROM VIDEOS

BACKGROUND

Technical Field

The present disclosure generally relates to computers and computer applications, and more particularly, to automatic sound generation from video.

Description of the Related Art

In recent years, media content has become ubiquitous in that it is available on various platforms and from an increasing number of sources. For example, the different platforms can include the Internet, cinema, television, radio, smartphones, audio CDs, books, e-books, magazines, and live events, such as speeches, conferences, and stage performances. Often media content based on video content may miss certain portions of audio content that corresponds thereto. For example, the video content may not have been recorded with a proper microphone, where portions or the entire sound is missing from the video content.

SUMMARY

According to various exemplary embodiments, a computing device, a non-transitory computer readable storage medium, and a method are provided of adapting a video stream to include a synthetic audio stream. A video feed is received and divided into a sequence of video segments. For each video segment, visual features are extracted. A predicted spectrogram is generated based on the extracted visual features. A synthetic audio waveform is generated from the predicted spectrogram. All synthetic audio waveforms of the video feed are concatenated to generate a synthetic soundtrack that is synchronized with the video feed.

In one embodiment, each video segment is a video frame.

In one embodiment, extracting visual features in the video segment comprises identifying one or more topics of the video segment.

In one embodiment, the visual features of the video segment include a dominant visual feature and one or more non-dominant visual features. A synthetic audio waveform associated with the dominant feature may be emphasized, whereas each synthetic audio waveform associated with the one or more non-dominant visual features may be de-emphasized.

In one embodiment, the determination is performed substantially in real time.

In one embodiment, generating a predicted spectrogram includes providing the extracted visual features into a generator operative to create the predicted spectrogram based on the extracted visual features. The generator network may be trained during a training phase, including: receiving historical data including one or more historic video feeds; for each historic video feed, and dividing the historic video feed into a sequence of video segments. For each video segment of a historic video feed, visual features in the video segment are extracted. A predicted spectrogram is generated based on the extracted visual features. A real spectrogram is compared to the predicted spectrogram by a discriminator network to identify a level of similarity. Upon determining that the level of similarity is above a predetermined threshold, the predicted spectrogram is identified to be a valid representation of the extracted visual features.

In one embodiment, the computing device is a user device. There is a camera is coupled to the processor and the video feed is received from the camera.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to automatic adaptation of video content to include a synthetic audio stream that is substantially synchronized thereto. Today, video content is provided by various sources, including broadcast or multicast from a content provider, such as a television station, social media, stored media, portable devices having a camera, and the like. In some scenarios, such video content may not include portions of audio content. For example, the video content may by overwhelmed by background noise, include distortions, and/or have the audio portion simply missing, such as when captured from a long distance or without a proper microphone. Although there have been recent attempts to introduce audio content to video after the video has been captured, the audio typically does not sufficiently correspond to the content of the video feed or may not be synchronous thereto, leading to a poor user experience.

Accordingly, what is provided herein are methods and devices that are configured to extract visual features from a video content and to generate a synthetic audio stream that not only provides an accurate sound representation of the video content, but is substantially synchronous thereto. To that end, machine learning can be used to study the relationship between visuals and sound for different subject matter, such as a crying child, a barking dog, a waterfall, a car driving by, an explosion, etc. Models of the relationship between visuals and its corresponding audio could be applicable for many applications such as combining videos with automatically generated ambient sound to provide a missing audio content and/or to enhance the experience of immersion in virtual reality. Automatically adding sound effects to video content can immediately enhance an audio-visual experience or enable a visually impaired individual to experience a visual environment via a representation by way of sound. The techniques described herein may be implemented in a number of ways. Example implementations are provided below with reference to the following figures.

Example Architecture

Figure 1:
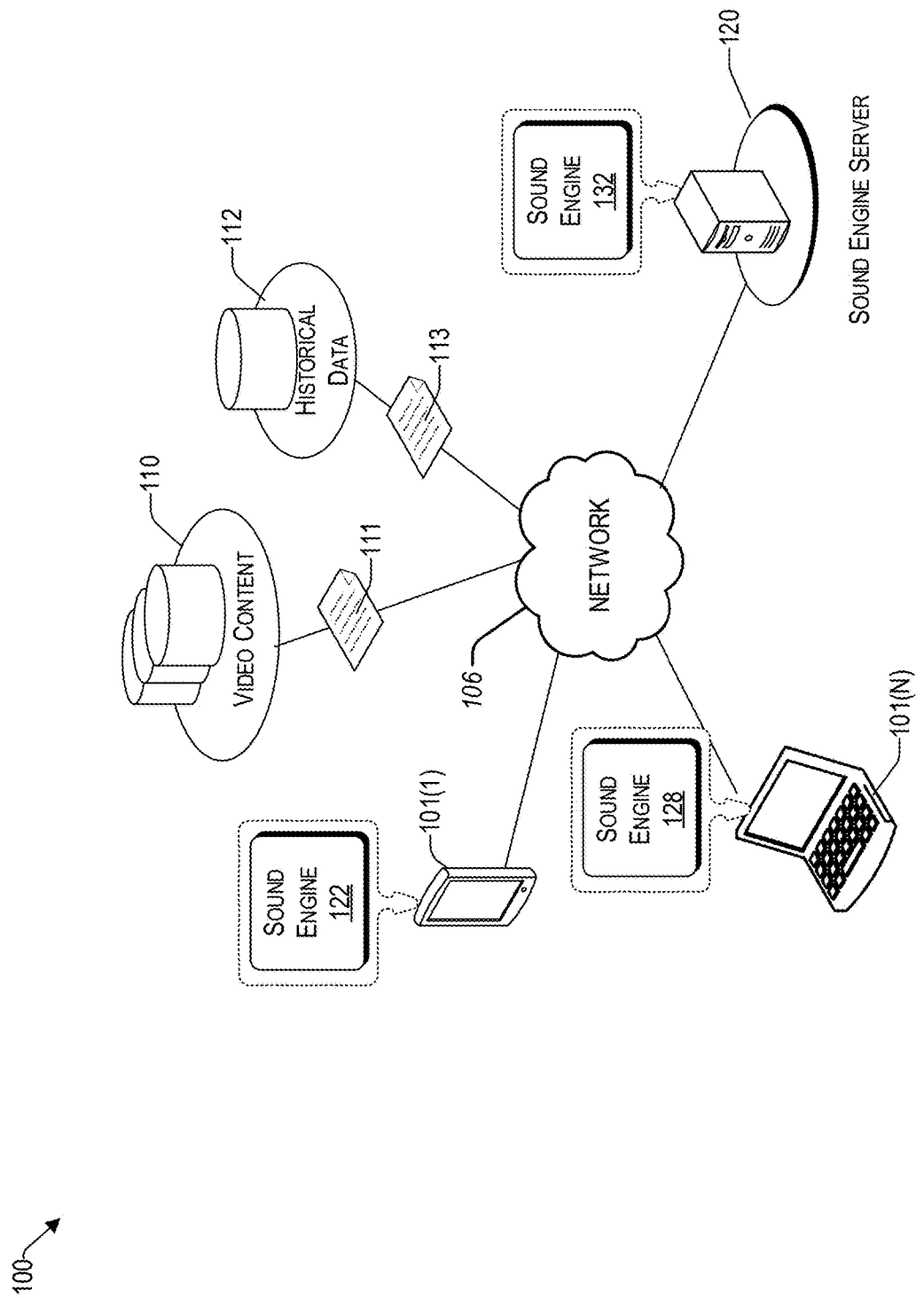
FIG. 1 is an example architecture of a system that automatically generates a synthetic audio track for a video stream, consistent with an illustrative embodiment.

FIG. 1 illustrates an example architecture 100 of a system that automatically generates a synthetic audio track for a video stream, consistent with an illustrative embodiment. Architecture 100 may include a historical data repository 112, a video content repository 110, and a sound engine server 120 that hosts a sound engine 132. There is a network that 106 allows the sound engine 132 to communicate with various resources connected to the network 106, such as the historical data repository 112, video content repository 110, and user devices 102(1) to 102(N). The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with the sound engine 132 to add synthetic audio streams for the video content received from the video content database 110 or the user devices 101(1) to 101(N).

For discussion purposes, different user devices 102(1) to 102(N) appear in the drawing, to represent some examples of the client devices that may be used to capture video content which can then be adapted to include synthetic audio streams that are synchronous to the captured video content. The synthetic audio stream can be created by a sound engine that is local to the user device (e.g., 122 or 128) or by a remote sound engine 132 hosted by the sound engine server 120. That is, in some embodiments, the user device may be independent from the network 106 and/or the sound engine server 120 in that it has the media content stored in its memory (e.g., hard disk, RAM, ROM, DVD, video tape, flash drive, etc.) or in a hardware component.

While the functions of the sound engines 122 and 128 may sometimes be discussed herein in the context of being integrated with user devices, it will be understood that the functions of the sound engine can be performed remotely (i.e., by a remote sound engine server 120). For example, there may be a sound engine server 120 that has a sound engine 132 having features similar to those of the sound engine 128 of user device 102(n). Thus, substantially similar functions to those of sound engines 122 and 128 can be performed remotely over a network 106. This is particularly useful if a user device does not have sufficient computing resources (e.g., not enough processing power) and/or to conserve the power of the user device. Thus, in one aspect, the computing technology is improved by the concepts herein by being able to disburden a computing device by performing one or more media functions remotely. Today, user devices typically take the form of portable handsets, smart-phones, tablet computers, personal digital assistants (PDAs), and smart watches, although they may be implemented in other form factors, including consumer, medical, and business electronic devices.

The historical data repository 112 is configured to store and maintain a large set of historical data 113 related to video content having a corresponding audio content. For example, the historical data 113 may include video content with identified visual features. In various embodiments these visual features can be used by the sound engine (e.g., 122, 128, and/or 132) to create a reference spectrogram, sometimes referred to herein as a real spectrogram, representing the "base truth" for later comparison purposes by a discriminator network. In some embodiments, the historical data repository 112 includes the real spectrogram, together with the visual features. In one embodiment, machine learning is used to construct algorithms that can learn from and make predictions based on the data that is stored in the historical data repository 112. Such algorithms operate by building a model from stored prior inputs or baselines therefrom in order to make data-driven predictions or decisions. Based on the machine learning, patterns and trends are identified, and any outliers identified as not belonging to a cluster. For example, machine learning can be used to identify the visual features of a frame of the video content, generate a predicted spectrogram based on visual features of a frame of the video content, as well as to generate a sound waveform based on the predicted spectrogram. In various embodiments, the machine models for each of these functions can be trained separately.

As used herein a visual feature relates to the subject matter of a scene, such as a barking dog, a crying baby, a construction site, etc. In some embodiments, the visual features may include a dominant feature together with ancillary (e.g., non-dominant) features. For example, a frame may include a car driving next to a fire truck. In this scenario, the car is an ancillary feature, while the dominant feature is the fire truck. Accordingly, the synthetic audio waveform associated with the dominant feature (i.e., fire truck in this example) is emphasized whereas ancillary features are de-emphasized (e.g., diminished or even muted), thereby simplifying the computational complexity and improving the sound emphasis of the subject matter.

In various embodiments, the machine learning discussed herein may be supervised or unsupervised. In supervised learning, during a training phase, the sound engine (e.g., 122, 128, and/or 132) may be presented with historical data 113 from the historical data repository 112 as data that is related to various categories (e.g., features), respectively. Put differently, the historical data repository 112 acts as a teacher for the sound engine 132. In unsupervised learning, the historical data repository 112 does not provide any labels as what is acceptable, rather, it simply provides historic data 113 to the sound engine server 120, which can be used to find its own structure among the data to predict a spectrogram, determine whether the predicted spectrogram is a sufficiently accurate representation of the visual features of the video content, and create a synthetic audio waveform from the predicted spectrogram. In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

Thus, during a training phase one or more models are created by machine learning, wherein the models can identify the visual features, provide a predicted spectrogram based on the visual features, determine whether the predicted spectrogram is a valid representation of the visual features, and ultimately provide a synthetic audio waveform based on the visual features. These models can then be used during an active phase, which may be able to process a video feed to provide a synthetic audio stream that is synchronized thereto afterwards or substantially in real time.

In various embodiments, the video feed 111 may be provided by a video content database 110 or can be created by the user devices 102(1) to 102(N) by way of cameras embedded therein. An example user device will be discussed in more detail later. Thus, in some scenarios, a user device may be self contained in that it not only can capture a video content but also process it independently to add an appropriate synthetic soundtrack thereto by way of a local content engine (e.g., 122). Such independence may be particularly useful in applications to enable a visually impaired to experience a visual environment via a representation by way of sound.

While the historical data repository 112, video content database 110, and the sound engine server 120 are illustrated by way of example to be on different computing platforms, it will be understood that in different embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage.

Example User Device

Figure 2:
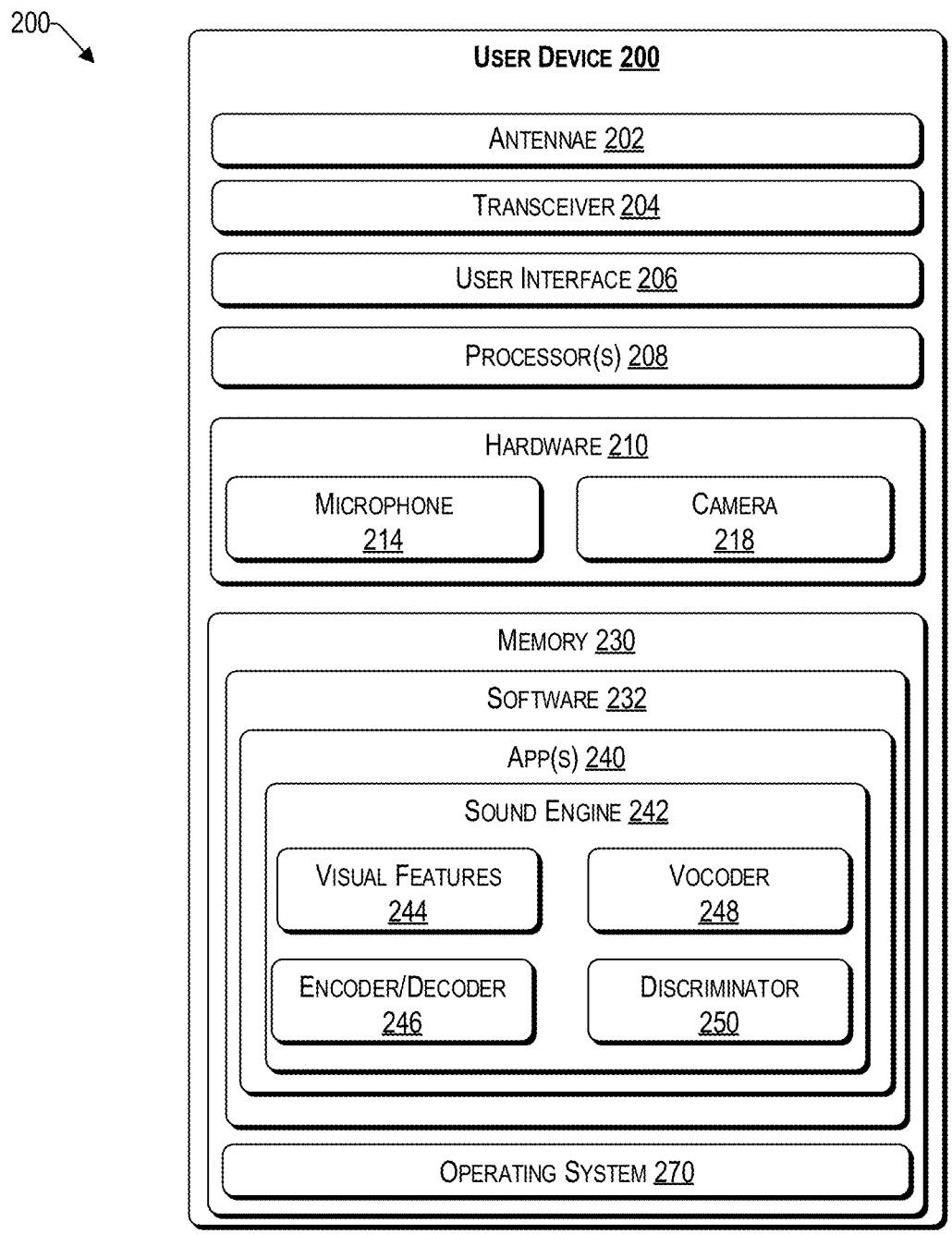
FIG. 2 is a block diagram showing various components of an example user device at a high level, consistent with an illustrative embodiment.

As discussed in the context of FIG. 1, the generation of a synthetic audio track for a video stream may involve different types of user devices. To that end, FIG. 2 illustrates a block diagram showing various components of an illustrative user device 200 at a high level. For discussion purposes, the illustration shows the user device 200 in the form of a wireless computing device, while it will be understood that other computing devices are contemplated as well.

The user device 200 may include one or more antennae 202; a transceiver 204 for cellular, Wi-Fi communication, short-range communication technology, and/or wired communication; a user interface 206; one or more processors 208; hardware 210; and memory 230. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the user device 200 does not include an antenna 202 and communication with external components is via wired communication.

In one embodiment, the user device 200 includes one or more user interface(s) 206 that enables a user to provide input and receive output from the user device 200. For example, the user interface 206 may include a data output device (e.g., visual display(s), audio speakers, haptic device, etc.) that may be used to provide visual content with a synthetic audio stream that is substantially synchronized thereto.

The user interface(s) 206 may also include one or more data input devices. The data input devices may include, but are not limited to, combinations of one or more of keypads, knobs/controls, keyboards, touch screens, speech recognition packages, and any other suitable devices or other electronic/software selection interfaces.

The user device 200 may include one or more processors 208, which may be a single-core processor, a multi-core processor, a complex instruction set computing (CISC) processor, gaming processor, or any other type of suitable processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may include hardware decoders and encoders, a network interface controller, and/or a USB controller.

The hardware 210 may include various sensors that may be used to harvest video and/or audio information. For example, there may be one or more microphones 214 that may be used to capture audio content and a camera 218 to capture video content. This video content can then be enhanced by the sound engine 242 locally or by a remote sound engine similar to that of the sound engine server 120 of FIG. 1, as discussed herein.

The user device 200 includes memory 230 that may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 230 may store various software components or modules that are executable or accessible by the processor(s) 208 and controller(s) of the user device 200. The various components of the memory 230 may include software 232 and an operating system 270. The software 232 may include various applications 240, such as a sound engine 242 having several modules, each configured to control a different aspect of the automatic adaptation of video content to include a synthetic audio stream that is substantially synchronized thereto. Each module may include routines, program instructions, objects, and/or data structures that perform tasks or implement abstract data types, discussed in more detail later.

In one embodiment, the sound engine 242 comprises a visual features module 244 that is configured to extract visual features from a segment (e.g., frame) of a video feed. There is an encoder/decoder module 246 operative to create a predicted spectrogram based on visual features that are extracted from a frame of a video feed. There is a vocoder 248 operative to use the predicted spectrogram to create a synthetic audio content segment therefrom. There is a discriminator module 250 operative to determine whether the predicted spectrogram is an accurate representation of the visual features of the video frame. While the modules of the sound engine 242 are described above in the context of a software application, it is noted that one or more functions can be performed in hardware 210.

The operating system 270 may include components that enable the user device 200 to receive and transmit data via various interfaces (e.g., user controls, communication interface, and/or memory input/output devices), as well as process data using the processor(s) 208 to generate output. The operating system 270 may include a presentation component that presents the output (e.g., display at least part of the media content on an electronic display of the user device 200, store the data in memory 230, transmit the data to another electronic device, etc.) Additionally, the operating system 270 may include other components that perform various additional functions generally associated with an operating system 270. By virtue of the hardware and software of the user device 200, a video feed can be adapted to include a synthetic audio stream that is synchronous thereto.

Example Block Diagram

Figure 3:
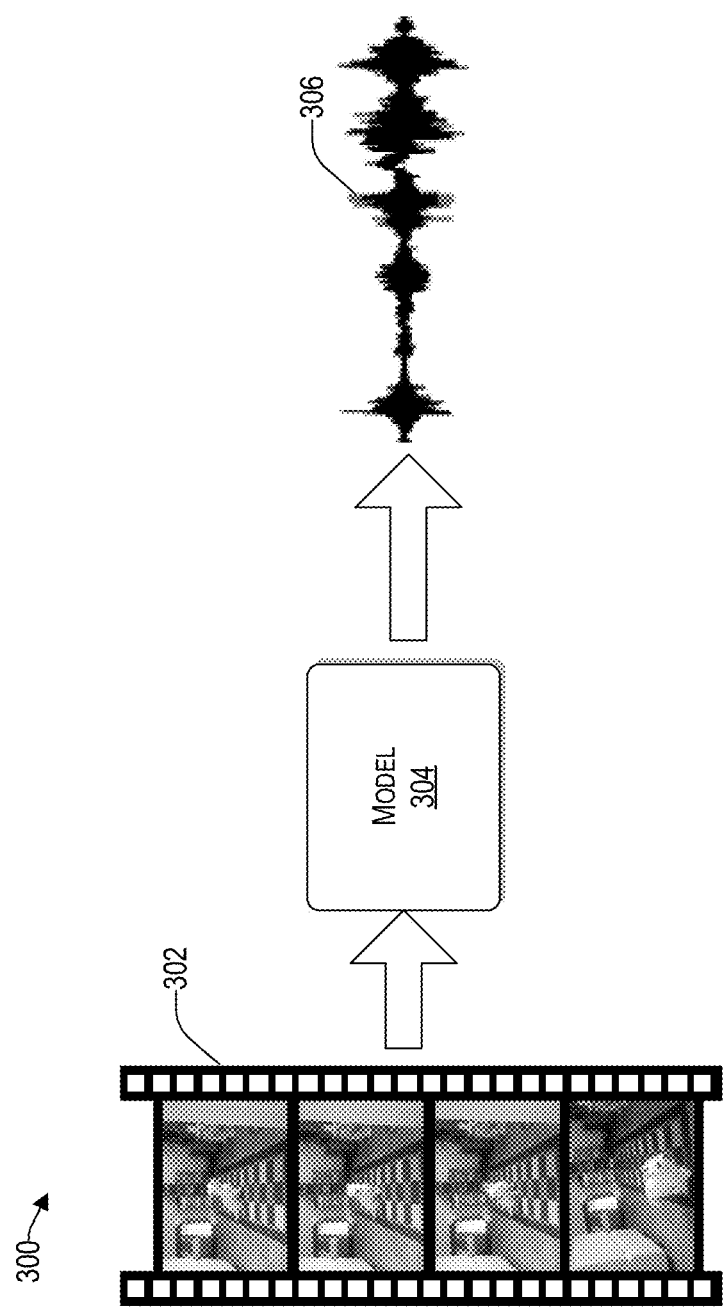
FIG. 3 illustrates a simplified conceptual block diagram of a generation of raw audio from a video feed.

FIG. 3 illustrates a simplified conceptual block diagram 300 of generation of raw audio 306 from a video feed. A video feed 302 comprising a series of frames is received by a sound engine. The sound engine can divide the video feed 302 into video segments, down to a granularity of single frames. Stated differently, each frame can be analyzed independently to provide a high level of granularity and synchronization. In one embodiment, to conserve the amount of computational complexity, a predetermined number of frames are skipped. The frames used are referred to herein as "relevant frames." In some embodiments, every frame is relevant.

A model 304 is applied to the frames to generate an audio that is substantially synchronized to the video feed 302. To that end, the model 304 is configured to, for each relevant frame, create a spectrogram by way of an encoder-decoder. The series of spectrograms are then used by the model to generate the synchronized sound 306 for the video feed 302. Unlike known approaches that may generate a sound waveform 306 based on the raw video feed, which damages the synchronization between visual content and the generated sound, the approach provided herein achieves substantial synchronization between the video feed 302 and its generated audio 306 by way of using a predicted spectrogram for each segment of a video feed 302. The creation of the model(s) 304, which is performed during a training phase, is discussed in detail below.

Example Artificial Intelligence Techniques

As mentioned above, various artificial intelligence techniques can be used to provide synthetic portions of the audio content based on the predicted spectrogram of different segments of a video feed. A spectrogram is a two-dimensional visual representation of the spectrum of frequencies of a signal as it varies with time. As used herein it is a visualization tool that allows the display of raw waveforms for individual features extracted from frames of a video stream. Stated differently, it is a picture of sound. For example, it shows the frequencies that make up the sound, from low to high, and how it changes over time, from left to right.

Figure 4A:
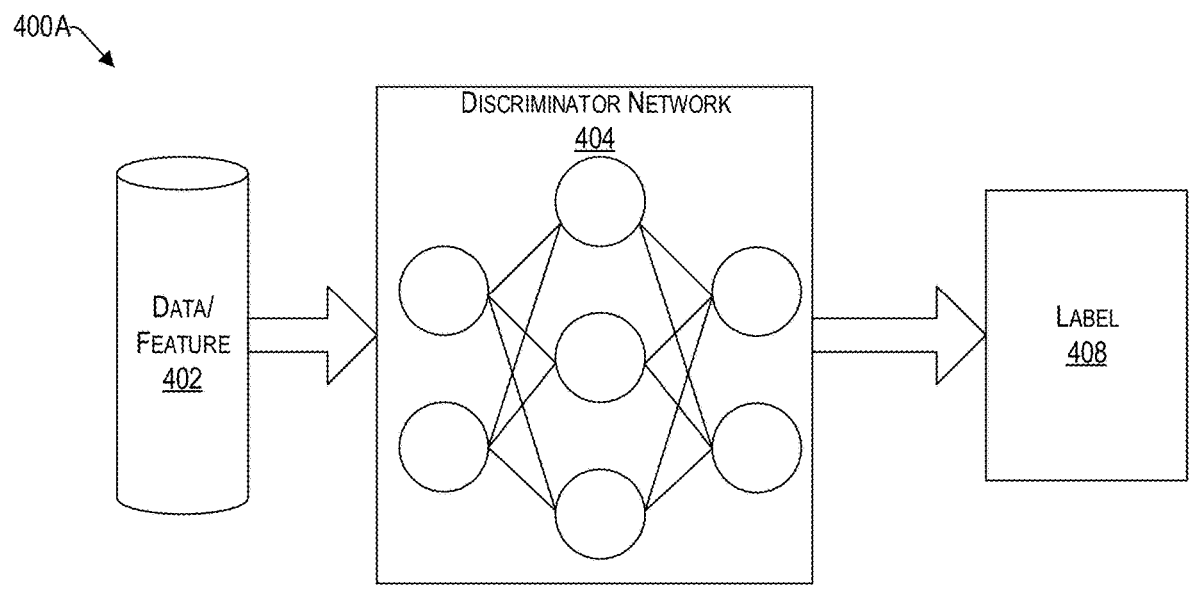
FIGS. 4A and 4B are example block diagrams of discriminative and generative architectures, respectively.

In some embodiments, generative adversarial networks (GANs) and/or discriminative approaches can be used to train the models to generate the synthetic audio content for a video feed and to determine whether the generated synthetic audio content is a valid representation of the video feed, respectively. In this regard, FIGS. 4A and 4B are example block diagrams of discriminative and generative architectures, which can be used to create synthetic audio content for a video feed, and/or determine whether the created video feed is a valid representation of the video feed, respectively.

Discriminator networks 404 can determine whether the predicted spectrogram of a video feed, which can be used to create a synthetic audio content, is a valid representation of a video feed by comparing the predicted spectrogram to a real spectrogram, representing the ground truth. In this way, the predicted spectrogram can be labeled 408 as "real" or "fake." Thus, if the similarity of the predicted spectrogram is above a predetermined threshold, then the discriminator network identifies it as sufficiently "real," which allows the discriminator network to indicate to a vocoder to use the predicted spectrogram in creating a synthetic audio content, discussed in more detail later.

Expressed mathematically, a label is referred to as y and the features are referred to as x. The expression $p(y|x)$ relates to "the probability of y given x." In view of the present example, the expression relates to the probability that the content provided by a predicted spectrogram is a valid representation of a video feed. In this way, discriminative algorithms can map the features of a predicted spectrogram of a frame (e.g., scene) to a label (i.e., "real" or "fake").

Figure 4B:
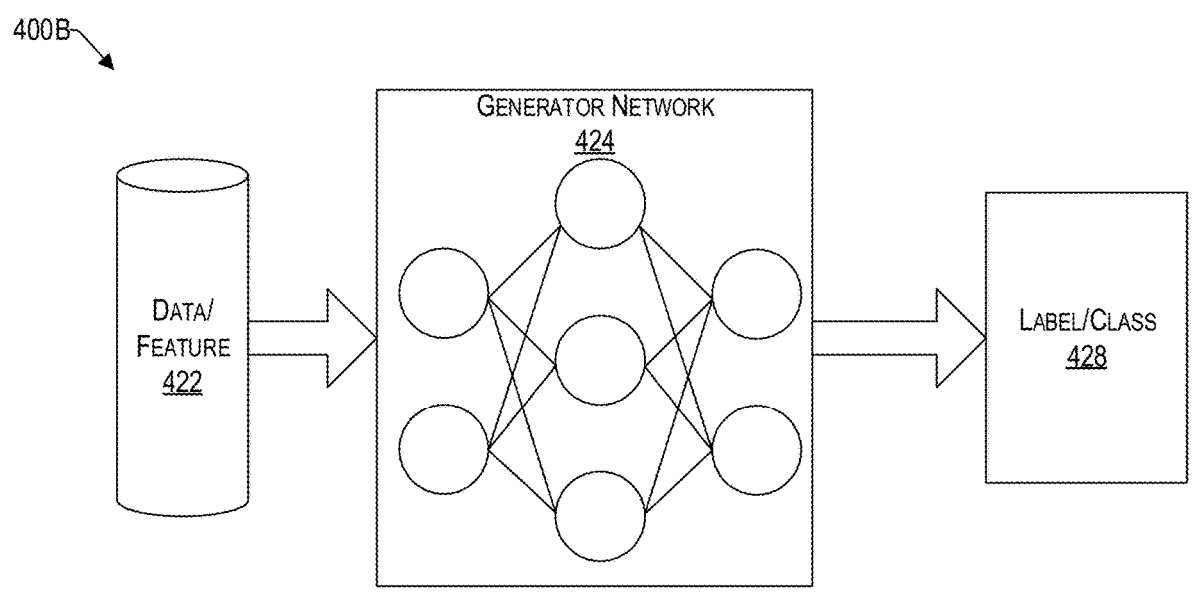

As to GANs, represented by generator network 424 in FIG. 4B, they are deep neural net architectures that include two nets, pitting one against the other (and thus the term "adversarial"). GANs have the capability to learn to mimic any distribution of data. Accordingly, a generator network 424, sometimes referred to herein as an encoder-decoder, can create a spectrogram based on visual features of a frame of a video feed, represented by data/feature block 422. Stated differently, instead of predicting a label given certain features (as in discriminative architectures), the generator network 424 can predict features given a certain label. For example, when visual features are identified in a frame of a video feed, the generator network 424 can use the visual features to generate a spectrogram. Thus, the generator network 424 is configured to generate a predicted spectrogram, while the discriminator network 404 evaluates the data for its authenticity.

Figure 5:
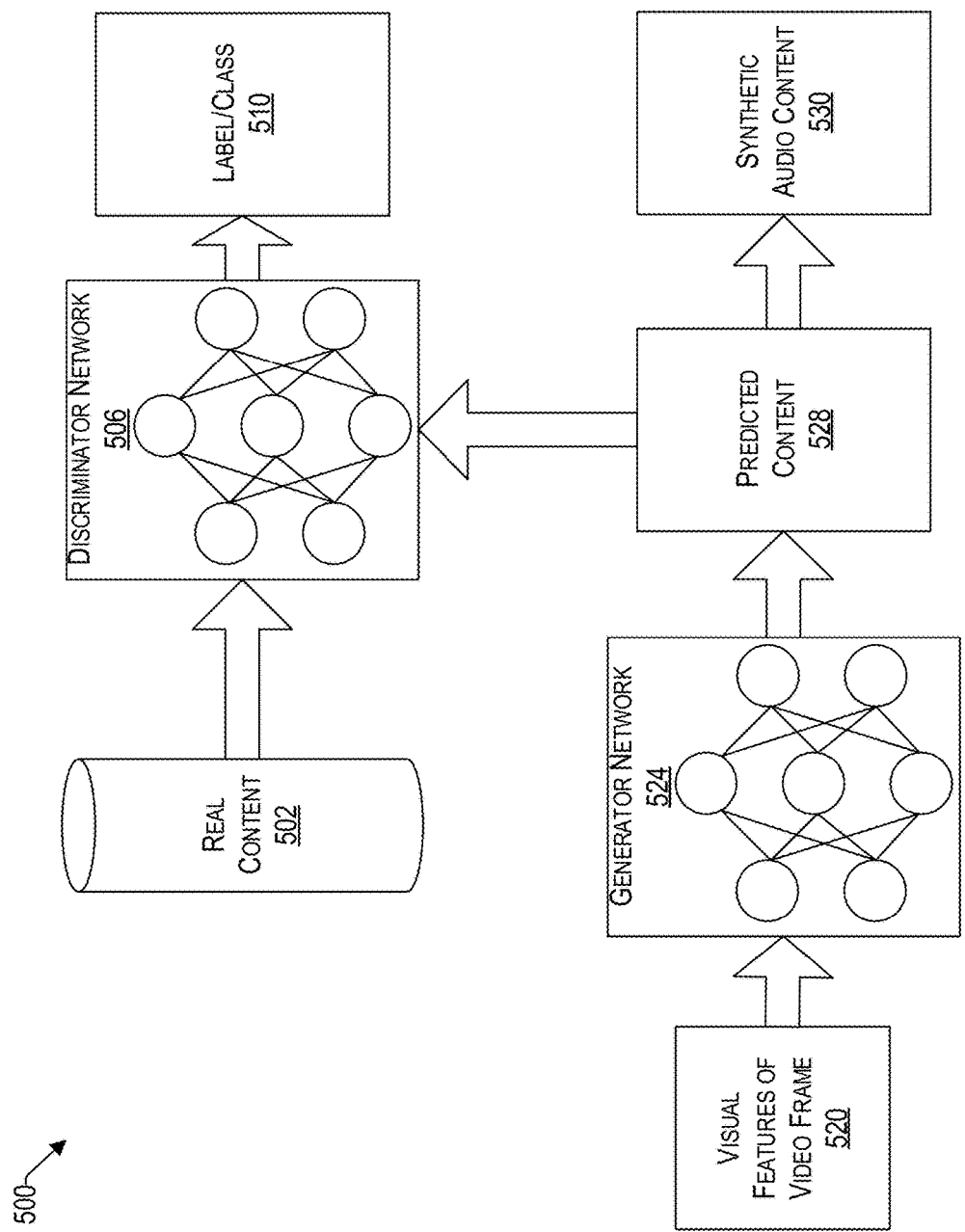
FIG. 5, which is a conceptual block diagram of an example neural network that includes a generative adversarial network interacting with a discriminator network, consistent with an illustrative embodiment.

With the foregoing overview of a generator and discriminator network, reference now is made to FIG. 5, which is a conceptual block diagram of an example neural network 500 that includes a generator network 524 interacting with a discriminator network 506. For example, the generator network 524 can create a predicted spectrogram 528 from visual features of a video frame 520. The predicted spectrogram can be used to create synthetic audio content 530.

In one embodiment, before the synthetic audio content 530 is created, a determination is made whether the predicted spectrogram 528 is a valid representation of the visual features of the video frame 520. To that end, the discriminator network 506 determines whether the predicted spectrogram 528 sufficiently resembles the real content 502. The real content 502 represents the ground truth, which can be used as a corpus of data for the discriminator network 506 to learn from. Upon review of the predicted spectrogram 528, the discriminator network 506, based on the reference real content 502, can provide a score (e.g., from 0 to 1, where 1 is the highest probability) regarding whether the predicted spectrogram 528 generated by the generator network 524 is sufficient to be part of a predetermined label/classification 510, which represents the output layer. If so, then the synthetic audio content 530 can be created from the predicted content 528. Accordingly, both the generator network 524 and the discriminator network 506 are constantly learning, but optimizing opposing objective functions (i.e., loss functions).

Figure 6:
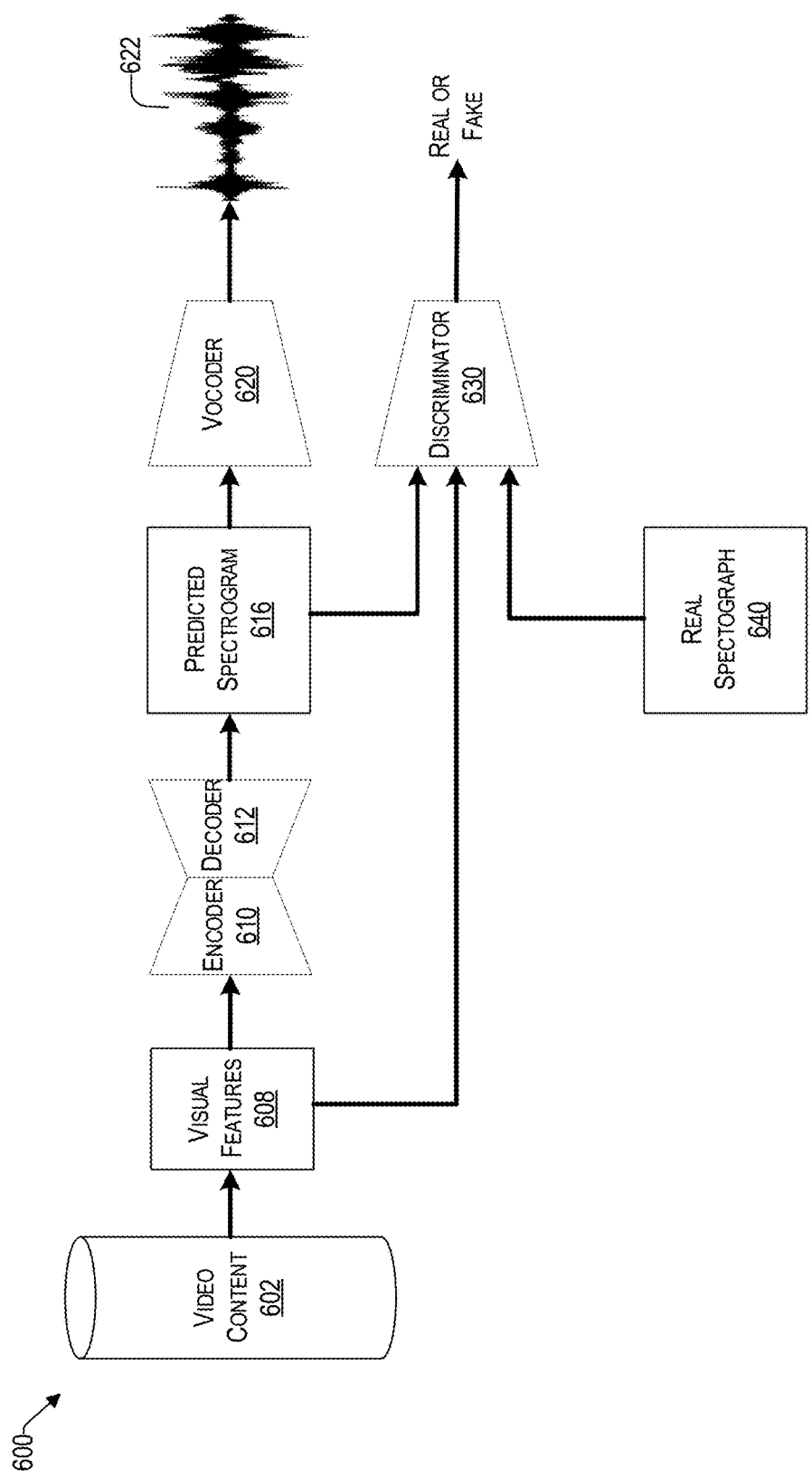
FIG. 6 is a conceptual block diagram of visual to sound system, consistent with an illustrative embodiment.

FIG. 6 is a conceptual block diagram of visual to sound system 600, consistent with an illustrative embodiment. There is video content 602 that may be generated by a computing device or received from a video content repository. For example, the video content 602 may be a video feed comprising a series of segments. Each segment may be of a predetermined length or as short as a single video frame. There is a visual feature module 608 that is operative to extract the visual features of each segment (e.g., frame). For example, the visual features may include children playing, a dog barking, a jackhammer, a running engine, an air conditioner, an ambulance, a fire, etc. These visual features of a segment are used by an encoder 610—decoder 612, representing a generator network, to provide a predicted spectrograph 616. In turn, the predicted spectrogram 616 can be used by a vocoder 620 to create a synthetic audio waveform 622 for the predicted spectrogram.

In one embodiment, there is a discriminator module 630 that is configured to determine whether the predicted spectrogram is a valid representation of the visual features 608 of the video segment. In one embodiment, this determination is performed before the synthetic audio waveform 622 is generated by the vocoder 620. To that end, the visual features 608 together with the predicted spectrogram 616 are compared to a real spectrogram 640 having similar visual features to determine whether the predicted spectrogram 616 has a similarity to the real spectrogram 640 that is above a predetermined threshold. Accordingly, the real spectrogram 640 represents the ground truth of the content. Upon determining that the similarity is above the predetermined threshold, then the vocoder 620 can use the predicted spectrogram 616 to generate the synthetic audio waveform 622 therefrom.

In one embodiment a vocoder having a PixelCNN architecture, such WaveNet is used. For example, such a generative model is able to generate various sounds, including speech, which can mimic different genre of sounds, including human speech. For example, during a training phase, historical data comprising real soundtracks of different visual features are used to train the vocoder 620. Upon completion of training, the vocoder can be used to generate a realistic sounding synthetic audio waveform 622. Upon generating the synthetic audio waveforms 622 for each segment of the video content 602, each of those segments can be concatenated in series to provide a soundtrack that is synchronized with the video feed 602.

Example Processes

Figure 7:
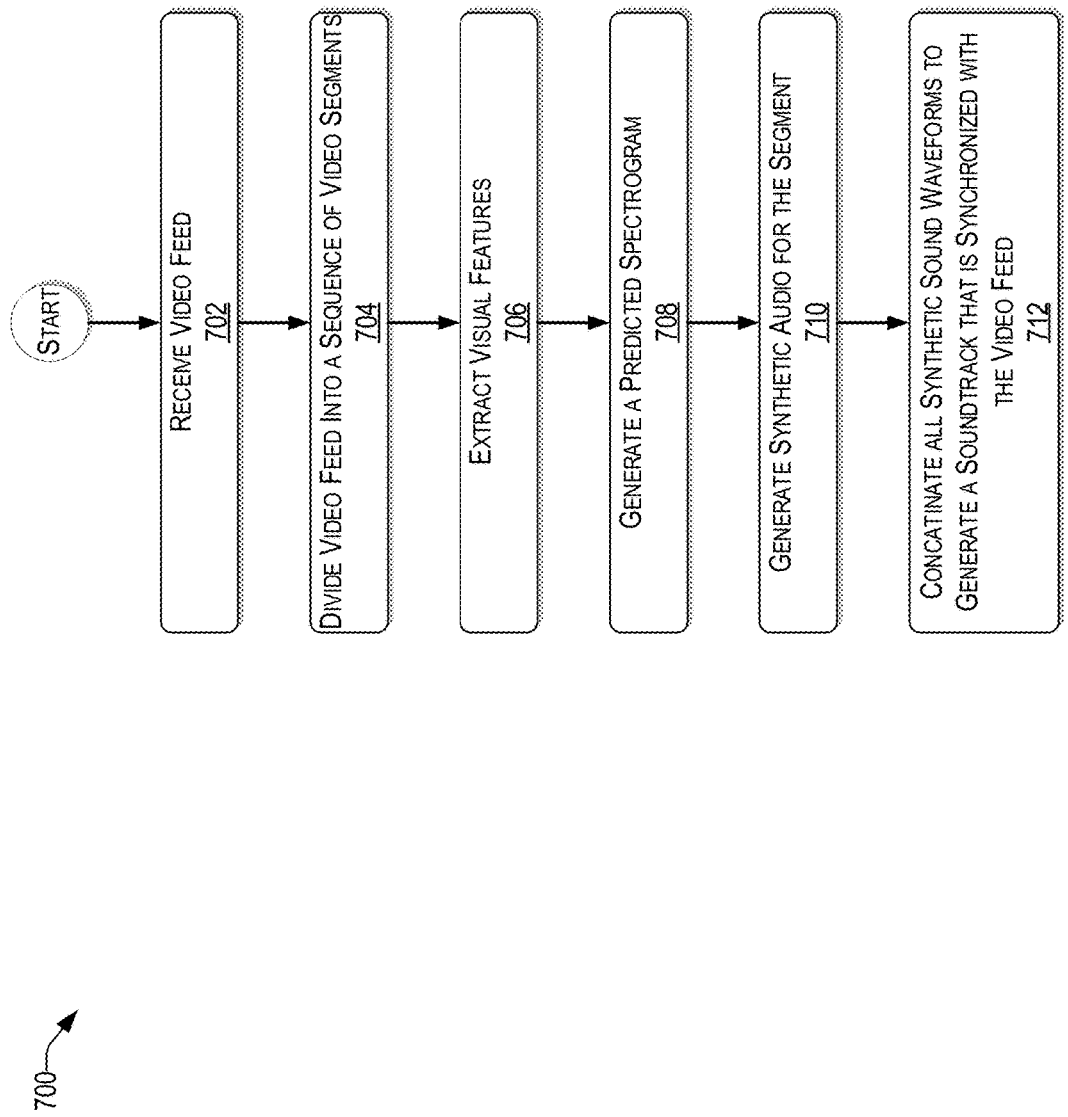
FIG. 7 presents an illustrative process for an automatic adaptation of video content to include a synthetic audio stream that is substantially synchronized thereto.

With the foregoing overview of the architecture 100, example user device 200, example artificial intelligence techniques 400A/B and 500, and conceptual block diagram of a visual to sound system 600 it may be helpful now to consider a high-level discussion of example call flow processes. To that end, FIG. 7 presents an illustrative process 700 for an automatic adaptation of video content to include a synthetic audio stream that is substantially synchronized thereto. Process 800 illustrates a training phase where models can be trained for the generator network, sometimes referred to herein as the encoder/decoder. Processes 700 and 800 are each illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 700 and 800 are described with reference to the architecture 100 of FIG. 1. More particularly, it will be assumed that the sound engine 132 is hosted by a sound engine server 120, while it will be understood that in other embodiments, the sound engine may be part of a user device (e.g., 102(1) to 102(N)).

At block 702, a video feed is received by the sound engine 132. In various embodiments, the video content may be received from a video content repository 110 or a user device (e.g., 102(1) to 102(N)).

At block 704, the video feed is divided by the sound engine 132 into a sequence of video segments. In one embodiment, a video segment is a single video frame, thereby providing a very fine granularity.

At block 706, for each video segment, visual features of the video segment are extracted. For example, one or more topics of the video segment are identified. In some scenarios, a video segment can include a dominant topic and one or more non-dominant topics. The latter can be de-emphasized in the synthetic audio waveform by the sound engine 132.

At block 708, a predicted spectrogram is generated based on the extracted visual features.

At block 710, a synthetic audio waveform is generated based on the predicted spectrogram by the sound engine 132. To that end, a vocoder, such as a WaveNet vocoder, can be used. The vocoder can be trained during a training phase by way of providing historical data from which it can learn from.

At block 712, all synthetic audio waveforms are concatenated in series to generate a synthetic soundtrack that is synchronous with the video feed.

Figure 8:
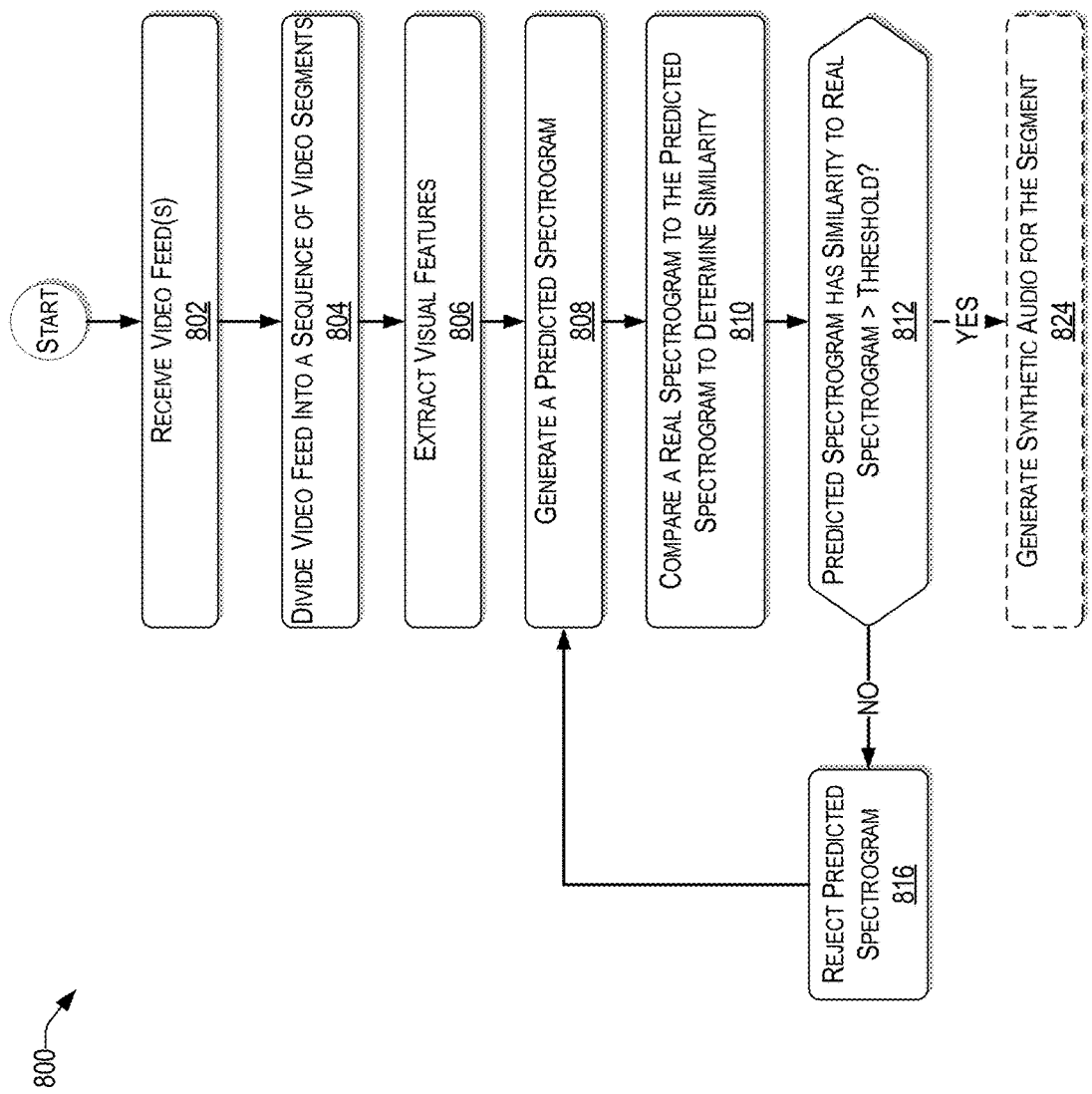
FIG. 8 presents an illustrative process of an iterative training phase.

Reference now is made to FIG. 8, which describes an example of an iterative training phase. At block 802, historical data 113 comprising one or more video feeds is received by the sound engine 132, from the historical data repository 112.

At block 804, each video feed is divided into a sequence of video segments by the sound engine 132.

At block 806, for each video segment of a video feed, visual features the video segment are extracted by the sound engine 132.

At block 808, the sound engine 132 generates a predicted spectrogram based on the extracted visual features.

At block 810, a real spectrogram, representing the ground truth, is compared to the predicted spectrogram by a discriminator network of the sound engine 132, to identify a level of similarity between the two spectrograms.

At block 812, upon determining that the level of similarity is above a predetermined threshold (i.e., "YES" at determination block 812), the predicted spectrogram is identified to be a valid representation of the extracted visual features. The spectrogram can then be used to generate synthetic audio for the segment (i.e., block 824). However, upon determining that the level of similarity is not above the predetermined threshold (i.e., "NO" at determination block 812), the process continues with block 816, where the predicted spectrogram is identified to be a false representation and hence rejected. The iterative process can then continue with block 808 where a new predicted spectrogram is generated. The more training that is provided, the more accurate the models discussed herein become.

Example Computer Platform

Figure 9:
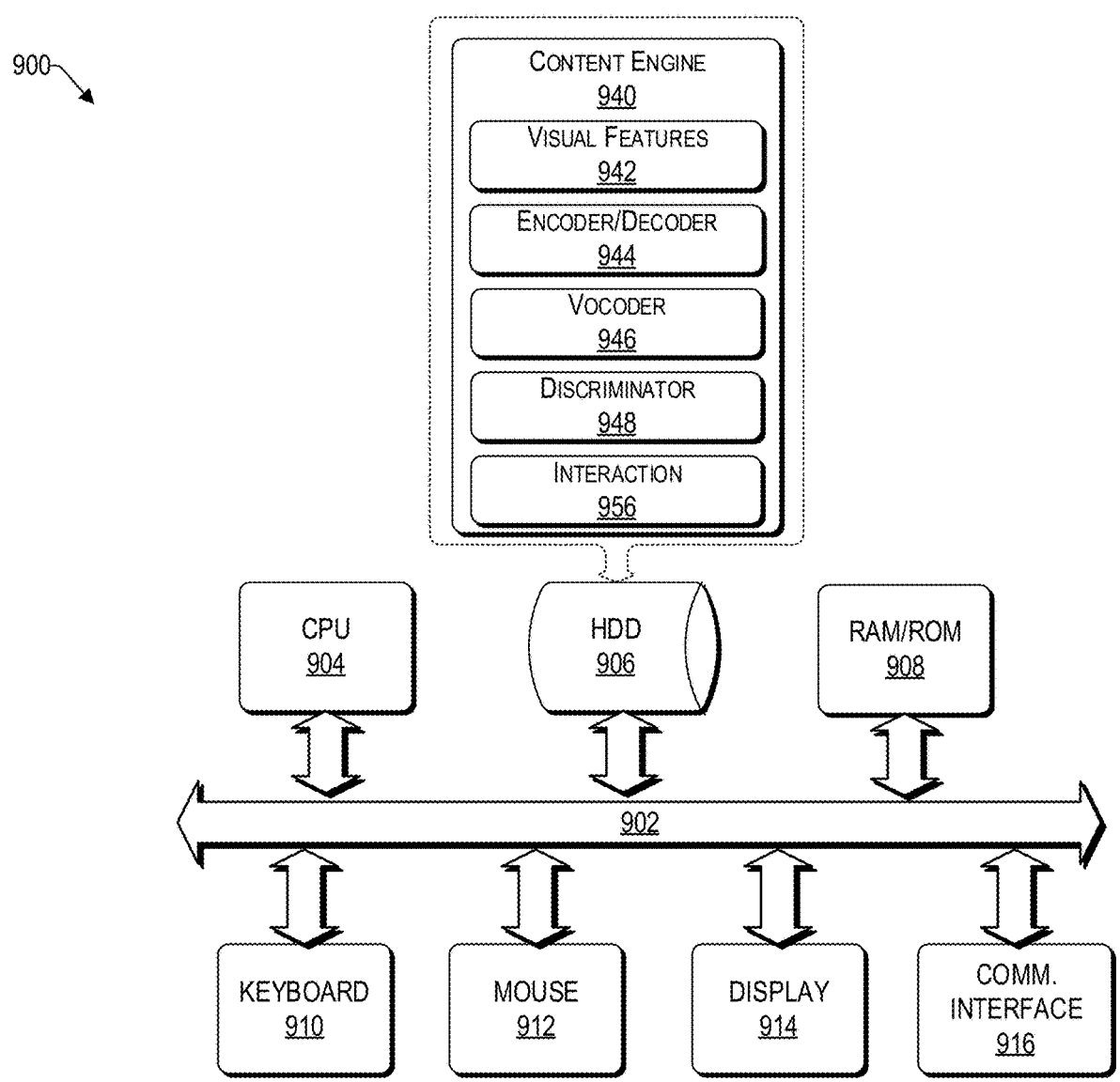
FIG. 9 is a functional block diagram illustration of a computer hardware platform that can implement a sound engine server of FIG. 1.

As discussed above, functions relating to automatically adapting a video stream to include a synthetic audio stream that is substantially synchronized thereto can be performed with the use of one or more computing devices connected for data communication via wireless or wired communication, as shown in FIG. 1. An example user device 200 in the form of a mobile device was discussed in the context of FIG. 2. FIG. 9 is a functional block diagram illustration of a computer hardware platform such as a user device or a sound engine server 120 that can communicate with various networked components.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as the sound engine 940, in a manner described herein. The sound engine 940 may have various modules configured to perform different functions. For example, there may be a visual features module 942 that is configured to extract visual features from a segment (e.g., frame) of a video feed. There is an encoder/decoder module 944 operative to create a predicted spectrogram based on visual features that are extracted from a frame of a video feed. There is a vocoder module 946 operative to use the predicted spectrogram to create a synthetic audio content segment therefrom. There is a discriminator module 948 operative to determine whether the predicted spectrogram is an accurate representation of the visual features of the video frame. There may be an interaction module 956 that is operative to interact with one or more computing devices and databases, such as video content repository 110, historical data repository 112, and user devices 102(1) to 102(N). While the modules of the sound engine 940 are described above in the context of the HDD 906, it is noted that one or more functions can be performed in hardware.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a sound engine stored in the storage device, wherein an execution of the sound engine by the processor configures the computing device to perform acts comprising:
   receiving a video feed;
   dividing the video feed into a sequence of video segments;
   for each video segment:
      extracting visual features of the video segment;
      generating a predicted spectrogram based on the extracted visual features; and
      generating a synthetic audio waveform from the predicted spectrogram; and
   concatenating all synthetic audio waveforms of the video feed to generate a synthetic soundtrack that is synchronized with the video feed,
   wherein a generator network is trained during a training phase, comprising:
   receiving historical data comprising one or more historic video feeds;
   for each historic video feed, dividing the historic video feed into a sequence of video segments;
   for each video segment of a historic video feed:
      extracting visual features in the video segment;
      generating a predicted spectrogram based on the extracted visual features;
      comparing a real spectrogram to the predicted spectrogram by a discriminator network to identify a level of similarity; and
   upon determining that the level of similarity is above a predetermined threshold, identifying the predicted spectrogram to be a valid representation of the extracted visual features.

2. The computing device of claim 1, wherein each video segment is a video frame.

3. The computing device of claim 1, wherein extracting visual features in the video segment comprises identifying one or more topics of the video segment.

4. The computing device of claim 1, wherein the visual features of the video segment comprise a dominant visual feature and one or more non-dominant visual features.

5. The computing device of claim 4, wherein a synthetic audio waveform associated with the dominant feature is emphasized, whereas each synthetic audio waveform associated with the one or more non-dominant visual features is de-emphasized.

6. The computing device of claim 1, wherein the determination is performed substantially in real time.

7. The computing device of claim 1, wherein generating a predicted spectrogram comprises: providing the extracted visual features into a generator operative to create the predicted spectrogram based on the extracted visual features.

8. The computing device of claim 1, wherein:
   the computing device is a user device;
   a camera is coupled to the processor; and
   the video feed is received from the camera.

9. A non-transitory computer readable storage medium tangibly embodying a computer readable program code having computer readable instructions that, when executed, causes a computing device to carry out a method of adapting a video stream to include a synthetic audio stream, the method comprising:
   receiving a video feed;
   dividing the video feed into a sequence of video segments;

for each video segment:
   extracting visual features of the video segment;
   generating a predicted spectrogram based on the extracted visual features; and
   generating a synthetic audio waveform from the predicted spectrogram; and
concatenating all synthetic audio waveforms of the video feed to generate a synthetic soundtrack that is synchronized with the video feed,
wherein a generator network is trained during a training phase, comprising:
   receiving historical data comprising one or more historic video feeds;
   for each historic video feed, dividing the historic video feed into a sequence of video segments;
   for each video segment of a historic video feed:
      extracting visual features in the video segment;
      generating a predicted spectrogram based on the extracted visual features;
      comparing a real spectrogram to the predicted spectrogram by a discriminator network to identify a level of similarity; and
      upon determining that the level of similarity is above a predetermined threshold, identifying the predicted spectrogram to be a valid representation of the extracted visual features.

10. The non-transitory computer readable storage medium of claim 9, wherein each video segment is a video frame.

11. The non-transitory computer readable storage medium of claim 9, wherein extracting visual features in the video segment comprises identifying one or more topics of the video segment.

12. The non-transitory computer readable storage medium of claim 9, wherein the visual features of the video segment comprise a dominant visual feature and one or more non-dominant visual features.

13. The non-transitory computer readable storage medium of claim 12, wherein a synthetic audio waveform associated with the dominant feature is emphasized, whereas a synthetic audio waveform associated with the one or more non-dominant visual features is de-emphasized.

14. The computing device of claim 9, wherein the adaptation of the video stream to include the synthetic audio stream is performed substantially in real time.

15. The non-transitory computer readable storage medium of claim 9, wherein generating a predicted spectrogram comprises: providing the extracted visual features into a generator operative to create the predicted spectrogram based on the extracted visual features.

16. A computing device comprising:
a processor;
a sound engine configured to perform acts comprising:
dividing the video feed into a sequence of video segments;
for each video segment:
   extracting visual features of the video segment;
   generating a predicted spectrogram based on the extracted visual features; and
   generating a synthetic audio waveform from the predicted spectrogram; and
concatenating all synthetic audio waveforms of the video feed to generate a synthetic soundtrack that is synchronized with the video feed,
wherein generating a predicted spectrogram comprises training a generator network during a training phase, comprising:
   receiving historical data comprising one or more historic video feeds;
   for each historic video feed, dividing the historic video feed into a sequence of video segments;
   for each video segment of a historic video feed:
      extracting visual features in the video segment;
      generating a predicted spectrogram based on the extracted visual features;
      comparing a real spectrogram to the predicted spectrogram by a discriminator network to identify a level of similarity; and
      upon determining that the level of similarity is above a predetermined threshold, identifying the predicted spectrogram to be a valid representation of the extracted visual features.

17. The computing device of claim 16, wherein extracting visual features in the video segment comprises identifying one or more topics of the video segment.

18. The computing device of claim 16, wherein:
the computing device is a user device;
a camera is coupled to the processor; and
the video feed is received from the camera.

* * * * *